(No Model.)

J. B. ERWIN.
AIR COMPRESSOR.

No. 329,377. Patented Oct. 27, 1885.

Witnesses
G. M. Gridley
M. Schinner

Inventor
James B. Erwin

UNITED STATES PATENT OFFICE.

JAMES B. ERWIN, OF MILWAUKEE, WISCONSIN.

AIR-COMPRESSOR.

SPECIFICATION forming part of Letters Patent No. 329,377, dated October 27, 1885.

Application filed January 5, 1885. Serial No. 152,072. (No model.)

*To all whom it may concern:*

Be it known that I, JAMES B. ERWIN, a citizen of the United States, residing at Milwaukee, in the county of Milwaukee and State of Wisconsin, have invented certain new and useful Improvements in Air-Compressors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in hydraulic air-compressors, and pertains to that class which are more especially used for elevating and preserving beer when on draft, and by which the beer may be placed under any desired air-pressure corresponding with the pressure of the water used.

Figure 1:
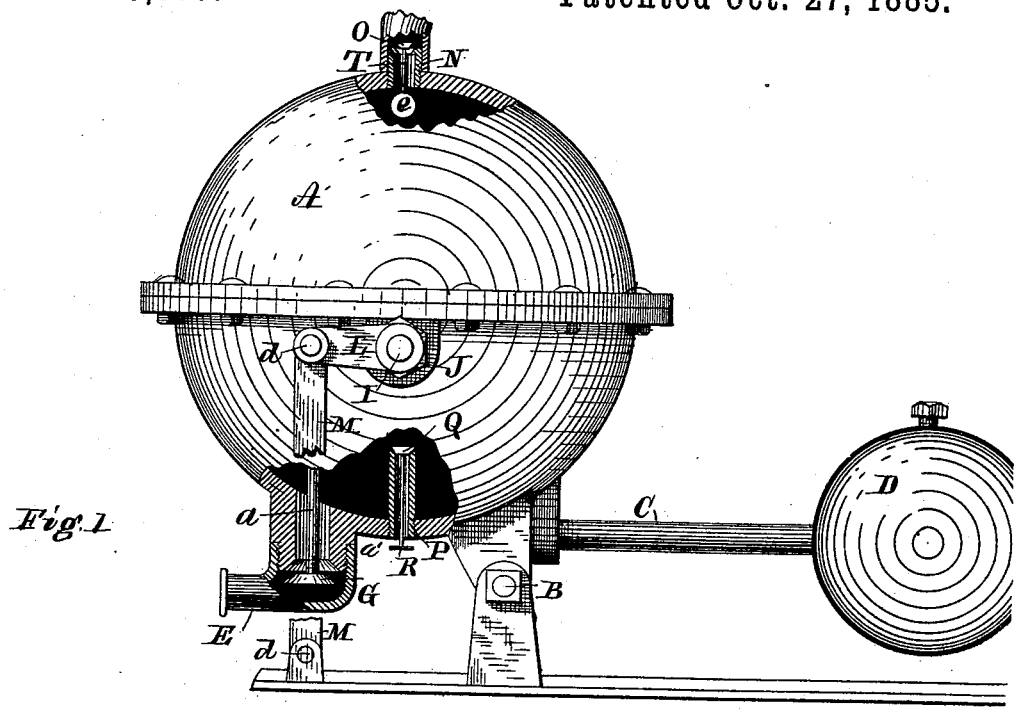
Figure 2:
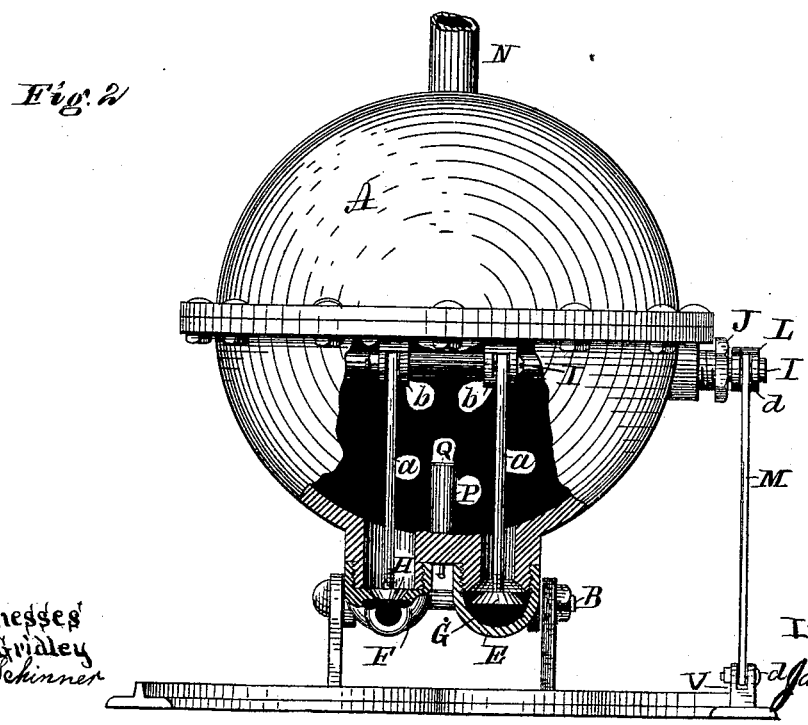

In the drawings, Figure 1 represents a side view of my invention, part in section, and Fig. 2 is a front view, part in section.

Like parts are represented by the same reference-letters in both views.

A is the compression-chamber, which is alternately filled with air and water, and as it is thus filled it oscillates upon its pivotal support B. Attached to said chamber upon the opposite side of said pivotal support is a lever, C, and counterpoise D, the gravity of which counterpoise is such as to cause said chamber A to be elevated when emptied of water, while said chamber and its contents, when nearly or quite full of water, will counterbalance said counterpoise D and descend, causing said counterpoise to be elevated.

The chamber A is provided with inlet-duct E and outlet-duct F, through which, respectively, the passage of water to and from said chamber is controlled by the valves G and H. The valve-stems *a a* of said valves are preferably of such length as to protrude from said chamber through the water-passages, so that I am enabled, by removing the ducts E and F, (in case repairs are required,) to easily reach said valves from the outside of the chamber. The upper ends of the ducts E and F are so enlarged as to form a small chamber around said valves, which permits of the required movements for opening and closing them. The valves and valve-seats are respectively reversely arranged to each other, the inlet-valve G being adapted to close upward with the pressure from the supply toward the compression-chamber, while the valve H closes outwardly also with the pressure from the chamber toward the escape. The seat of the valve G is formed above the valve in the duct leading from the chamber, while the seat of the valve H is formed in the duct F. Both ducts E and F may be readily unscrewed from the chamber in case the valves or their seats require attention. It is obvious that by this arrangement of the valves to their seats one of them is closed as the other is opened, and vice versa; also, that the length of the oscillation of the chamber is limited by the adjustment of said valves to their seats, and may be increased or diminished by adjusting either of said valves higher or lower upon its valve-stem. The chamber A being full of water, it swings downward until the valve G is brought to its seat, the valve H being simultaneously raised from its seat, and they thus remain until the chamber has been emptied of its contents through the duct F, when the chamber swings upward again until the valve H is brought to its seat. Thus both valves close with positive movements with the pressure of the water. The inlet-duct is always open for the admission of water when the chamber A is up, so that when full it will be caused to descend by the gravity of its contents, while the gravity of the weight D will cause it to rise as soon as emptied, and thus continue the required movements for operating the device. The valves G and H are controlled in their movements as the chamber A ascends and descends by the bar M, acting through the lever L, shaft I, arms *b b*, and valve-stems *a a*. The bar M is connected at its respective ends, one with the arm L and the other with the bracket V, by pins *d d*, and in operating retains the forward ends of the lever L and arms *b b* in line with each other and at a uniform height, while the opening and closing of the valve-seats is accomplished by said seats moving toward and from said valves as said chamber A rises and falls. One end of the shaft I is seated in an aperture in the inner wall of said chamber A, while the protruding end is surrounded by a stuffing-nut, J. As the water enters the chamber A, the air therein is expelled thereby through the pipe N, from whence it is conducted to the air-reservoir through a flexible tube. The pipe N is provided with a chuck-valve, O, which is raised by the air as it is forced out and closes of its own gravity, together with the compressed air above it as soon as the influx of water is stopped. The counterpoise D is made adjustable upon the lever C, so that it may be moved toward or from the pivotal support, as required, to counterbalance the compression-chamber. As the water flows of its own gravity from the compression-chamber, which it does when at the lower extremity of its movement, air rushes in to take its place through the tube P, and in so doing raises the check-valve Q. The water continues thus to escape and the air to enter until by the gravity of the counterpoise the receptacle A is raised and the escape of water stopped. The valve Q is provided with a long valve stem, R, which extends down through the tube P, below the lower surface of the receptacle A, and is provided with a retaining cross-pin, $a'$, which prevents the valve from being thrown from the tube, and is accessible to a person if desirous of turning the valve in its seat as may be required for removing obstruction.

To the lower end of the valve-stem T is attached a small float, $c$, which serves the twofold purpose of retaining the valve in its place and closing the lower end of the pipe N in case the water rises high enough to float it, thus preventing water from entering the air-tube. The compression-chamber is retained in its upper position until filled and in its lower position until emptied, and is caused to move in either direction past the center of gravity with an accelerated movement by locating its pivotal point below its center of gravity, by which means I attain a quick positive movement in both directions and avoid the possibility of the device becoming balanced at an intermediate point between the extremity of its movements.

Having thus described my invention, what I claim as new, and desire to secure by Letters Patent, is—

1. The combination of an oscillating air-compression chamber mounted upon a pivotal support and counterbalanced by a weight, a valve shaft extending through the wall of the chamber, provided upon its inner end with valve-actuating arms, valve-rods, and inlet and outlet valves, and upon its protruding end with an actuating-arm connecting said shaft by a bar or rod at a fixed point to the base or supporting bracket, substantially as set forth.

2. The combination, in an air-compressor, of an oscillating chamber, A, formed in two parts, and having lugs for the reception of the pivotal support, bracket V, having upward-extending pivotal lugs, pivotal support B, lever C, rigidly affixed at one end to said chamber, above said pivotal support, and adjustable weight D, said chamber being provided with inlet and outlet water and air valves, and adapted to oscillate on said pivotal support as it is filled and emptied, as set forth.

3. The combination, with the compression-chamber A, mounted upon a pivotal support and counterbalanced by a weight and lever, of the shaft I, arms $b\ b$, valve-rods $a\ a$, valves G and H, operating in reversely-arranged valve-seat ducts E and F, lever L, affixed to the protruding end of said rod I, bracket V, and bar M, connected at one end to said arm and at the other to said bracket, whereby as said compression-chamber and counterpoise are oscillated said valves will be alternately opened and closed, substantially as and for the purpose set forth.

4. The combination, in an air-compressor, with a single water-receiver provided with inlet and outlet water-pipes and counterbalanced upon a pivotal support by a weight, of inlet air-tube P, having self-acting valve Q, adapted to be opened by external air-pressure and closed by internal air and water pressure, and outlet air-tube N, having self-closing valve O, adapted to be opened by internal air-pressure and closed by gravity and external air-pressure, substantially as set forth.

In testimony whereof I affix my signature in presence of two witnesses.

JAMES B. ERWIN.

Witnesses:
C. T. BENEDICT,
G. M. GRIDLEY.